United States Patent
Moren

(10) Patent No.: US 6,383,655 B1
(45) Date of Patent: May 7, 2002

(54) LOW ODOR POLYMERIZABLE COMPOSITIONS USEFUL FOR BONDING LOW SURFACE ENERGY SUBSTRATES

(75) Inventor: Dean M. Moren, North St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/700,944

(22) PCT Filed: Jun. 12, 1998

(86) PCT No.: PCT/US98/12260

§ 371 Date: Nov. 21, 2000

§ 102(e) Date: Nov. 21, 2000

(87) PCT Pub. No.: WO99/64528

PCT Pub. Date: Dec. 16, 1999

(51) Int. Cl.$^7$ ............... B32B 27/30; C08F 220/00; C08F 4/52; C09D 4/00; C09J 4/00
(52) U.S. Cl. .............. 428/522; 156/325; 156/326; 252/182.18; 428/422; 428/520; 526/195; 526/198; 526/328; 526/328.5
(58) Field of Search .............. 252/182.18; 526/195, 526/198, 328, 328.5; 428/422, 520, 522; 156/325, 326

(56) References Cited

U.S. PATENT DOCUMENTS

| | | |
|---|---|---|
| 2,985,633 A | 5/1961 | Welch et al. ............... 260/85.3 |
| 3,050,505 A | 8/1962 | Litterio |
| 3,141,862 A | 7/1964 | Kirshenbaum et al. ..... 260/45.5 |
| 3,275,611 A | 9/1966 | Mottus et al. ............. 260/80.5 |
| 3,340,193 A | 9/1967 | Fields et al. ................... 252/56 |
| 3,418,260 A | 12/1968 | Trofimenko ..................... 260/2 |
| 3,425,988 A | 2/1969 | German et al. ............... 260/47 |
| 3,451,961 A | 6/1969 | Slocombe ................... 260/2.5 |
| 3,476,727 A | 11/1969 | Lo Monaco et al. ........ 260/92.8 |
| 3,527,737 A | 9/1970 | Masuhara et al. .......... 260/78.5 |
| 3,725,504 A | 4/1973 | Owston |
| 3,829,973 A | 8/1974 | Masuhara et al. ............. 32/15 |
| 3,832,274 A | 8/1974 | Owston |
| 3,873,640 A | 3/1975 | Owston et al. |
| 3,959,568 A | 5/1976 | Hill, Jr. et al. |
| 4,167,616 A | 9/1979 | Bollinger ..................... 526/197 |
| 4,379,728 A | 4/1983 | Lin ........................... 156/307.3 |
| 4,485,229 A | 11/1984 | Waddill et al. .............. 528/111 |
| 4,515,724 A | 5/1985 | Ritter ......................... 260/410 |
| 4,524,181 A | 6/1985 | Adam et al. ................. 525/107 |
| 4,538,920 A | 9/1985 | Drake ......................... 366/177 |
| 4,638,092 A | 1/1987 | Ritter ............................. 568/1 |
| 4,639,498 A | 1/1987 | Ritter ......................... 526/196 |
| 4,656,229 A | 4/1987 | Chiao ......................... 525/518 |
| 4,676,858 A | 6/1987 | Ritter ......................... 156/307.3 |
| 4,684,538 A | 8/1987 | Klemarczyk ............... 427/54.1 |
| 4,721,751 A | 1/1988 | Schappert et al. .......... 524/773 |
| 4,731,416 A | 3/1988 | Saunders ..................... 525/131 |
| 4,775,734 A | 10/1988 | Goel ............................. 528/89 |
| 4,874,814 A | 10/1989 | Cartier et al. ................. 525/61 |
| 4,904,360 A | 2/1990 | Wilson, Jr. et al. ......... 204/181.7 |

(List continued on next page.)

FOREIGN PATENT DOCUMENTS

| | | |
|---|---|---|
| AU | 649582 | 10/1993 |
| CA | 664459 | 6/1963 |
| CA | 2061021 | 10/1992 |
| EP | 0 051 796 | 10/1981 |
| EP | 0 040 079 A1 | 11/1981 |
| EP | 0 167 223 | 1/1986 |
| EP | 0 268 985 A2 | 6/1988 |
| EP | 0 435 173 A2 | 7/1991 |
| EP | 0 511 464 A1 | 11/1992 |
| EP | 0 659 859 A1 | 6/1995 |
| GB | 904403 | 8/1962 |
| GB | 988632 | 4/1965 |
| GB | 1113722 | 5/1968 |
| GB | 1132261 | 10/1968 |
| JP | 42-14318 | of 0000 |
| JP | 45-29195 | 9/1970 |
| JP | 46-16888 | 5/1971 |
| JP | 48-18928 | 6/1973 |
| JP | 53-102394 | 9/1978 |
| JP | 62-288675 | 12/1987 |
| JP | 3-177470 | 8/1991 |
| JP | 3229777 | 10/1991 |
| JP | 3-264509 | 11/1991 |
| JP | 93-235089 | 9/1993 |
| JP | A-7-138544 | 5/1995 |
| JP | A-8-134408 | 5/1995 |
| JP | A-7-138542 | 5/1996 |
| WO | WO 93/23472 | 11/1993 |
| WO | WO 97/07171 | 2/1997 |
| WO | WO 97/17383 | 5/1997 |
| WO | WO 98/12296 | 3/1998 |
| WO | WO 98/17694 | 4/1998 |
| WO | WO 98/30645 | 7/1998 |
| WO | WO 99/64475 | 12/1999 |
| WO | WO 99/64528 | 12/1999 |
| WO | WO 00/56779 | 9/2000 |

OTHER PUBLICATIONS

*Hydroboranes*, pp. 55–56 (1962).

Nöth H. et al., "$^{11}$B–und $^{14}$N–Kernresonanzstudien an tetrakoordinierten Bor–Strickstoff–Verbindungen," *Chem. Ber.*, 107 pp. 3070–3088 (1974).

(List continued on next page.)

*Primary Examiner*—D. S. Nakarani
(74) *Attorney, Agent, or Firm*—Scott A. Bardell

(57) ABSTRACT

Low odor polymerizable compositions comprise monomer blends having a average monomer fluorophilicity of at least 3.25, an average boiling point of at least about 160° C., and wherein the monomer blend is polymerizable to a polymer having a glass transition temperature of at least about −20° C. The polymerizable compositions are useful in kits further comprising an aerobic initiator. Also disclosed are bonding compositions, polymerized compositions, coated substrates, and methods of bonding in which the polymerizable compositions are especially useful.

24 Claims, No Drawings

U.S. PATENT DOCUMENTS

| | | | |
|---|---|---|---|
| 4,920,188 A | 4/1990 | Sakashita et al. | 526/196 |
| 4,921,921 A | 5/1990 | Ritter | 526/195 |
| 4,985,516 A | 1/1991 | Sakashita et al. | 526/196 |
| 5,021,507 A | 6/1991 | Stanley et al. | 525/127 |
| 5,082,147 A | 1/1992 | Jacobs | 222/137 |
| 5,106,928 A | 4/1992 | Skoultchi et al. | 526/196 |
| 5,143,884 A | 9/1992 | Skoultchi et al. | 502/160 |
| 5,286,821 A | 2/1994 | Skoultchi | 526/196 |
| 5,310,835 A | 5/1994 | Skoultchi et al. | 526/198 |
| 5,376,746 A | 12/1994 | Skoultchi | 526/196 |
| 5,401,805 A | 3/1995 | Chung et al. | 525/288 |
| 5,512,527 A | 4/1996 | Ritter | 502/150 |
| 5,539,070 A | 7/1996 | Zharov et al. | 526/198 |
| 5,599,622 A | 2/1997 | Kinzer et al. | 428/355 EP |
| 5,616,796 A | 4/1997 | Pocius et al. | 564/9 |
| 5,621,143 A | 4/1997 | Pocius | 564/8 |
| 5,681,910 A | 10/1997 | Pocius | 526/198 |
| 5,684,102 A | 11/1997 | Pocius | 526/198 |
| 5,686,544 A | 11/1997 | Pocius | 526/196 |
| 5,690,780 A | 11/1997 | Zharov et al. | |
| 5,691,065 A | 11/1997 | Zharov et al. | |
| 5,712,331 A | 1/1998 | Ryang | 523/400 |
| 5,718,977 A | 2/1998 | Pocius | 428/422 |
| 5,795,657 A | 8/1998 | Pocius | 428/516 |
| 5,833,208 A | 11/1998 | Lee, Jr. | |
| 5,859,160 A | 1/1999 | Righettini et al. | |
| 5,872,197 A | 2/1999 | Deviny | |
| 5,935,711 A | 8/1999 | Pocius et al. | 428/421 |

OTHER PUBLICATIONS

*Polyurethanes: Chemistry and Technology*, vol. XVI, Part I, J.H. Saunders, pp. 160–173 (1962).

The Trialkylborane–initiated Graft Copolymerization of Methyl Methacrylate onto Hemoglobin, K. Kojima, S. Iwabuchi and K. Kojima, *Bulletin of the Chemical Society of Japan*, vol. 44, pp. 1891–1895 (1971).

A New Method for the Graft Copolymerization of Methyl Methacrylate onto Proteins and Fibers, *Polymer Letters*, vol. 9, pp. 25–29 (1971).

The Grafting of Methyl Methacrylate onto Cotton by Tri–n–butylborane, K. Kojima, S. Iwabuchi, K. Murakami, K. Kojima and F. Ichikawa, *Journal of Applied Polymer Science*, vol. 16, pp. 1139–1148 (1972).

Grafting of Vinyl Monomers by Tri–n–Butylborane onto Chlorophyll and Related Compounds, *Polymer Letters Edition*, vol. 13, pp. 361–363 (1975).

Tributylborane–Initiated Grafting of Methyl Methacrylate onto Chitin, K. Kojima, M. Yoshikuni and T. Suzuki, *Journal of Applied Polymer Science*, vol. 24, pp. 1587–1593 (1979).

Grafting of Methyl Methacrylate onto Silk Fibers Initiated by Tri–n–Butylborane, M. Tsukada, T. Yamamoto, N. Nakabayashi, H. Ishikawa and G. Freddi, *Journal of Applied Polymer Science*, vol. 43, pp. 2115–2121 (1991).

Molecular Weight Distribution of the Methyl Methacrylate (MMA) Polymer Separated from the MMA–Grafted Silk Fiber, M. Tsukada, Y. Goto, G. Freddi, T. Yamamoto and N. Nakabayashi, *Journal of Applied Polymer Science*, vol. 44, pp. 2197–2202 (1992).

Synthesis of Functionalized Polypropylene and Polypropylene–Polymethylmethacrylate Graft Copolymer, D. Rhubright and T.C. Chung, Proceedings of the American Chemical Society, *Polymeric Materials Science and Engineering*, vol. 67, pp. 112–113 (1992).

Polymerization of Acrylonitrile in Presence of Tributylborine, G. Kolesnikov and L. Fedorova, translated from *Bull. Acad. Sci. USSR, Div. Chem. Sci.*, p. 236 (1957).

Tributylborine: A Catalyst for the Polymerization of Unsaturated Compounds, G. Kolesnikov and N.V. Klimentova, translated from *Bull. Acad. Sci. USSR, Div. Chem. Sci.*, p. 666 (1957).

Triethylboron as an Initiator for Vinyl Polymerization, J. Furukawa, T. Tsuruta and S. Inoue, *Journal of Polymer Science*, vol. XXVI, Issue No. 113, pp. 234–236 (1957).

Oxygen Compounds as Cocatalyst for Triethylboron–Catalyzed Vinyl Polymerization, J. Furukawa and T. Tsuruta, *Journal of Polymer Science*, vol. XXVIII, Issue No. 116, pp. 227–229 (1958).

Mechanism of the Polymerization of Acrylonitrile in Presence of Tributylborine, G. Kolesnikov and L. Fedorova, translated from *Bull. Acad. Sci. USSR, Div. Chem. Sci.*, p. 906 (1958).

Mechanism of Trialkylboron Initiated Polymerization, J. Fordham and C. Sturm, *Journal of Polymer Science*, vol. XXXIII, No. 126, pp. 503–504 (1958).

Cocatalytic Activity of Some Metal Salts on Vinyl Polymerization with Tributhylboron, I. M. Panayotov, *Comptes rendus de l'Academie bulgare des Sciences*, vol. 14, No. 2, pp. 147–150 (1961).

Polymerization with Organoboron Compounds, F. Arimoto, *Journal of Polymer Science: Part A–1*, vol. 4, pp. 275–282 (1966).

On the Existence of a Free–Radical Organoboron Complex in the Polymerization of Methyl Methacrylate, R. Kern and J. Schaefer, *Polymer Letters*, vol. 5, pp. 157–162 (1967).

Vinyl Monomer Polymerization Mechanism in the Presence of Trialkylboranes, J. Grotewold, E. Lissi and A. Villa, *Journal of Polymer Science: Part A–1*, vol. 6, pp. 3157–3162 (1968).

Free–Radical Polymerization of Methyl Methacrylate in the Presence of Trialkylboranes, P. Brindley and R. Pearson, *Polymer Letters*, vol. 6, pp. 831–835 (1968).

Ethylene Polymerization in Presence of Tributylboron, G. Kolesnikov and T. Soboleva, *Scientific and Research Publications of the Members of the All Union Chemical Society Name After Mendilev*, vol. 2, p 663 (1957).

Studies on Dental Self–Curing Resins (II), S. Fujisawa, Y. Imai and E. Masuhara, *Reports of the Institute for Medical & Dental Engineering*, vol. 3, pp. 64–71 (1969).

Free–Radical Copolymerization of 1,2–Dichloroethylenes. Evidence for Chain Transfer by Chlorine Atom Elimination, T. Dawson, R. Lundberg and F. Welch, *Journal of Polymer Science: Part A–1*, vol. 7, pp. 173–181 (1969).

Mechanism of Vinyl Monomer Polymerization in the Presence of Trialkylboranes and Inhibitors, E. Aranchibia et al., *Journal of Polymer Science: Part A–1*, vol. 7, pp. 3430–3433 (1969).

Polymerization of Methyl Methacrylate by Trialkylborane–Pyridine System, K. Kojima et al., *Polymer Letters*, vol. 8, pp. 541–547 (1970).

Polymerization Initiated by Triethylborane–Peroxide Mixtures, E. Abuin et al., *Polymer Letters*, vol. 7, pp. 515–518 (1970).

Polymerization of Methyl Methacrylate by Co–ordination Compounds of Tri–n–butylborane with Some Electron–donating Compounds, Kojima et al., *Research Report of the Chiba University Faculty of Engineering*, vol. 22, No. 41, pp. 47–55. (English Abstract).

Polymerization of Methyl Methacrylate Initiated by Tri–n–butylborane–Organic Halide Systems, M. Yoshikuni, M. Asami, S. Iwabuchi and K. Kojima, *Journal of Polymer Science*, vol. 11, pp. 3115–3124 (1973).

Polymerization of Methyl Methacrylate Initiated by Tributylborane–Pyridine System, Kojima et al., *Journal of the Japanese Chemical Society*, No. 11, pp. 2165–2171 (1972). (English Abstract).

The Copolymerization of Vinylhydroquinone and Acrylonitrile by Tri–n–butylborane, S. Iwabuchi, M. Ueda, M. Kobayashi and K. Kojima, *Polymer Journal*, vol. 6, No. 2, pp. 185–190 (1974).

Free Radical Polymerization in the Presence of Triethylborane, E. Abuin, J. Cornejo and E. Lissi, *European Polymer Journal*, vol. 11, pp. 779–782 (1975).

Polymerization of Methyl Methacrylate by tri–n–butylborane in the presence of amino acid esters, K. Kojima, S. Iwabuchi, Y. Moriya and M. Yoshikuni, *Polymer*, vol. 16, pp. 601–604 (1975).

Analysis of Mechanism of Radical Formation Resulted from the Initiator System of Triethylboron and Oxygen by Spin Trapping Technique, Sato et al., *Journal of the Japanese Chemical Society*, No. 6, pp. 1080–1084 (1975). (English Abstract).

Development of Adhesive Pit and Fissure Sealants Using a MMA Resin Initiated by a Tri–n–butyl Borane Derivative, N. Nakabayashi and E. Masuhara, *Journal of Biomedical Materials Research*, vol. 12, pp. 149–165 (1978).

Vinyl Acetate Polymerization Initiated by Alkylborane–oxidizer–type Systems, S. Ivanchev, L. Shumnyi and V. Konovalenko, *Polymer Science U.S.S.R.*, vol. 22, No. 12, pp. 3000–3006 (1980).

Preparation of Hard Tissue Compatible Materials: Dental Polymers, N. Nakabayashi and E. Masuhara, *Biomedical Polymers*, pp. 85–111 (1980).

Mechanism of Initiation of Polymerization of Vinyl Monomers by Means of the Trialkylborane–Acid System, S. Ivanchev and L. Shumnyi, translated from Doklady Akademii Nauk SSSR, vol. 270, No. 5, pp. 1127–1129 (1983).

Effect of Organic Bases on Initiating Properties in the System Boronalkylelemental Organic Peroixde During Vinylchloride Polymerization, T. Guzanova, Master Thesis of the Fifth (graduate) year student, Ministry of High and Secondary Special Education Russia, Gorky State University (1983).

Application of Spin Trapping Technique to Radical Polymerization, 20, T. Sato, N. Fukumura and T. Otsu, *Makromol. Chem.*, 184, pp. 431–442 (1983).

Importance of Polymerization Initiator Systems and Interfacial Initiation of Polymerization in Adhesive Bonding of Resin to Dentin, Y. Imai, Y. Kadoma, K. Kojima, T. Akimoto, K. Ikakura and T. Ohta, *J. Dent. Res.*, vol. 70, No. 7, pp. 1088–1091 (1991).

Vibrational Analysis by Raman Spectroscopy of the Interface Between Dental Adhesive Resin and Dentin, M. Suzuki, H. Kato and S. Wakumoto, *J. Dent. Res.*, vol. 70, No. 7, pp. 1092–1097 (1991).

Laser–Raman Spectroscopic Study of the Adhesive Interface Between 4–MET/MMA–TBB Resin and Hydroxyapatite or Bovine Enamel, M. Ozaki, M. Suzuki, K. Itoh and S. Wakumoto, *Dental Materials Journal*, vol. 10, No. 2, pp. 105–120 (1991).

Polymerization of Some Vinyl Monomers on Triisobutylboron–Containing Radical Initiators in the Presence of Hydroquinone and Benzoquinone, V. Dodonov and D. Grishin, *High Molecular Compounds*, vol. 35, No. 3, pp. 137–141 (1993). (English Abstract).

Synthesis of PP–g–PMMA, PP–g–PVA and PP–g–PCL Copolymers, D. Rhubright and T. Chung, American Chemical Society, Division of Polymer Chemistry, Papers Presented at the Chicago, Illinois Meeting, vol. 34, No. 2, pp. 560–561 (1993).

Functionalized and Grafted Polyolefin Copolymers Prepared by Tansition Metal Catalysts and Borane Monomers, T. Chung, *Polymer Reprints*, vol. 35, No. 1, pp. 674–675 (1994).

Photochemical Modification of Fluorocargon Resin Surface to Adhere with Epoxy Resin, M. Okoshi, T. Miyokawa, H. Kashiura and M. Murahara, *Mat. Res. Soc. Symp. Proc.*, vol. 334, pp. 365–371 (1994).

Chemical Abstract No. 88532r, *Chemical Abstracts*, vol. 73, 1970.

Chemical Abstract No. 134385q, *Chemical Abstracts*, vol. 80, 1974.

"Adhesion Problems at Polymer Surfaces" by D.M. Brewis that appeared in *Progress in Rubber and Plastic Technology*, vol. 1, p. 1 (1985)).

*Treatise on Adhesion and Adhesives* (J.D. Minford, editor, Marcel Dekker, 1991, New York, vol. 7, pp. 333–435).

LOW ODOR POLYMERIZABLE COMPOSITIONS USEFUL FOR BONDING LOW SURFACE ENERGY SUBSTRATES

FIELD OF THE INVENTION

The present invention relates generally to polymerizable compositions useful for bonding low surface energy substrates. Also disclosed are polymerizable compositions and bonding compositions prepared therefrom, a kit comprising the polymerizable composition, coated substrates prepared therefrom, bonded articles prepared therefrom, and methods of preparing such bonded articles. In particular, the polymerizable compositions comprise monomer blends comprising certain ethylenically unsaturated monomers.

BACKGROUND OF THE INVENTION

An efficient, effective means for adhesively bonding low surface energy plastic substrates such as polyethylene, polypropylene and polytetrafluoroethylene (e.g., available under the trade designation, TEFLON from E. I. DuPont de Nemours; Wilmington, Del.) has long been sought. The difficulties in adhesively bonding these materials are well known (See, for example, "Adhesion Problems at Polymer Surfaces" by D. M. Brewis that appeared in *Progress in Rubber and Plastic Technology*, vol. 1, p. 1 (1985)).

Conventional bonding approaches often use complex and costly substrate surface preparation techniques, such as flame treatment, corona discharge, plasma treatment, oxidation by ozone or oxidizing acids, and sputter etching. Alternatively, the substrate surface may be primed by coating it with a high surface energy material. However, to achieve adequate adhesion of the primer, it may be necessary to first use the surface preparation techniques described above. All of these techniques are well known, as reported in *Treatise on Adhesion and Adhesives* (J. D. Minford, editor, Marcel Dekker, 1991, New York, vol. 7, pp. 333 to 435). The known approaches are frequently customized for use with specific substrates. As a result, they may not be generally useful for bonding low surface energy substrates.

Moreover, the complexity and cost of the presently known approaches do not render them particularly suitable for use by the retail consumer (e.g., for home repairs, do-it-yourself projects, etc.) or by low-volume operations. One vexing problem is the repair of many inexpensive everyday household articles that are made of low surface energy materials. Examples of such household articles are trash baskets, laundry baskets, toys, etc.

Consequently, there has been a considerable and long felt need for a simple, easy to use adhesive that can readily bond a wide variety of substrates, especially low surface energy materials, such as polyethylene, polypropylene and polytetrafluoroethylene, without requiring complicated surface preparation, priming and the like.

While an adhesive that can bond low surface energy substrates is certainly advantageous, the commercial utility of such an adhesive would be enhanced if the components thereof could be combined in a convenient mix ratio. This would permit easy application of the adhesive using conventional adhesive dispensers without the need for laborious hand weighing and mixing of the different components. However, the convenient mix ratio should not come at the expense of significantly reduced storage stability or performance. Thus, there is not only a need for an adhesive that can bond low surface energy substrates, but for such an adhesive that can be readily blended in a convenient mix ratio.

It may be desirable for such adhesives to possess other attributes. For example, polymerizable acrylic adhesives are often associated with a strong and unpleasant odor. While not affecting performance, the odor may discourage some people from using these adhesives and encourage them to select other alternatives. In addition, for certain situations, it may be desirable to utilize adhesives that have decreased irritation-potential (e.g., skin and respiratory irritation). In general, low molecular weight (i.e., molecular weights of 140 or less) acrylate monomers are known to be potentially irritating to the user.

Polymerization of ethylenically unsaturated monomers is well known. For example, Ritter (U.S. Pat. No. 4,385,153) discloses single-component mixtures of aerobically-hardening adhesives containing: (1) polymerizable olefinically-unsaturated compounds having a molecular weight of between 63 and 10,000; (2) at least one organoboron compound capable of initiating the polymerization thereof in the presence of oxygen; and (3) at least one compound capable of inhibiting and/or stabilizing anionic polymerization. The adhesives are useful for bonding metal, wood, glass, ceramic material, and plastics, as well as in dentistry and surgery.

Two-part initiator systems useful in preparing acrylic adhesive compositions are also known. For example, see Skoultchi (U.S. Pat. No. 5,286,821). Skoultchi discloses two-part initiator systems useful for preparing acrylic adhesive compositions. The systems include a stable organoboron amine complex and an aldehyde destabilizer. The adhesive compositions are reportedly particularly useful in structural and semi-structural applications, such as speaker magnets, metal-metal bonding (automotive), glass-metal bonding, glass-glass bonding, circuit board component bonding, selected plastic to metal, glass, wood, and electric motor magnets. Those plastics that may be bonded are not further described. See also Skoultchi et al. (U.S. Pat. Nos. 5,106,928 and 5,310,835).

Polymerizable compositions useful for bonding low surface energy substrates have been reported only recently, for example, by Zharov et al. (U.S. Pat. No. 5,539,070). Zharov et al. generally disclose polymerizable acrylic monomer compositions made with polymerization systems based on organoborane amine complexes. Particularly preferred monomers are stated to be blends of alkyl acrylates (e.g., butyl acrylate) and alkyl methacrylates (e.g., methyl methacrylate).

Pocius (U.S. Pat. No. 5,686,544) discloses organoborane polyamine complex initiator systems and polymerizable compositions that are capable of forming polyurethane/polyurea acrylic adhesives that have exceptionally good adhesion to low surface energy polymers, such as polyethylene, polypropylene, and polytetrafluoroethylene. Acrylic monomers are generally disclosed therein as useful for the reaction. It is stated, however, that the most preferred monomers include lower molecular weight methacrylate esters such as methyl methacrylate, ethyl methacrylate, methoxyethyl methacrylate, hydroxyethyl methacrylate, hydroxypropyl methacrylate, cyclohexyl methacrylate, tetrahydrofurfuryl methacrylate, and blends thereof. It is also stated that preferred monomers are blends of lower molecular weight alkyl methacrylate esters (e.g., methylmethacrylate) and $C_4$–$C_{10}$ alkyl acrylates (e.g., butylacrylate). Similar systems are disclosed in Pocius (U.S. Pat. Nos. 5,616,796 and 5,621,143). While the foregoing polymerizable compositions may be useful for bonding low surface energy substrates, one disadvantage thereof is the relatively high odor of the exemplified compositions.

It would be desirable to provide new compositions that are polymerizable to compositions that can be used to bond low surface energy substrates. Most preferably, it would be desirable to provide compositions that have relatively low odor, as compared to conventional compositions.

SUMMARY OF THE INVENTION

Polymerizable compositions for use with an aerobic initiator comprise a monomer blend comprising:

a first ethylenically unsaturated monomer; and a second ethylenically unsaturated monomer, wherein the monomer blend has an average boiling point of at least about 160° C., and an average monomer fluorophilicity of at least 3.25, and wherein the monomer blend is polymerizable to a polymer having a glass transition temperature of at least about −20° C.

Such compositions are advantageously less odorous than monomer blends previously exemplified for used when bonding low surface energy substrates. To further reduce the odor of the compositions, preferably the average boiling point of the monomer blend is at least about 190° C., more preferably at least about 210° C. This enables more user-friendly adhesives. To further enhance user-friendliness, it is preferred that at least one, more preferably both, of the ethylenically unsaturated monomers, is a methacrylate monomer when (meth)acrylate monomers are used.

Such compositions typically enable adequate bonding to low surface energy substrates, preferably to at least two different low surface energy substrates, and more preferably to at least three different low surface energy substrates. Exemplary low surface energy substrates include: polypropylene (PP), polytetrafluoroethylene (PTFE), and high-density polyethylene (HDPE). Most preferably, a particular adhesive prepared therefrom is able to adequately bond PTFE with an overlap shear bond strength of at least about 300 psi (4.14 MPa), HDPE with an overlap shear bond strength of at least about 700 psi (4.83 MPa), and PP with an overlap shear bond strength of at least about 800 psi (5.52 MPa).

To enhance such bonding performance, it is preferred that the monomer blend has an average monomer fluorophilicity of at least about 3.50. Also, it is preferred that the monomer blend is polymerizable to a polymer having a glass transition temperature of about 20° C. to about 80° C.

With respect to specific preferred monomer components, the monomer blend comprises: 10–90 wt. % M1, 25–70 wt. % M2, and 0–65 wt. % M3 based on total eight of the monomer blend, wherein:

M1 is tetrahydrofurfuryl methacrylate; M2, is one or more monomers selected from the group consisting of 2-ethoxyethyl methacrylate, n-hexyl acrylate, cyclohexyl methacrylate, isooctyl acrylate, 2-ethylhexyl acrylate, 2-ethylhexyl methacrylate, and isobornyl acrylate; and M3 is one or more monomers selected from the group consisting of isobutyl methacrylate, n-butyl methacrylate, cyclohexyl acrylate, n-hexyl methacrylate, isobornyl methacrylate, and isodecyl methacrylate.

With respect to even more preferred monomer components, M2 is one or more monomers selected from the group consisting of 2-ethoxyethyl methacrylate, cyclohexyl methacrylate, isooctyl acrylate, 2-ethylhexyl acrylate, 2-ethylhexyl methacrylate, and isobornyl acrylate, and M3 is one or more monomers selected from the group consisting of n-hexyl methacrylate, isobornyl methacrylate, and isodecyl methacrylate. Most preferably, M2 is one or more monomers selected from the group consisting of 2-ethoxyethyl methacrylate, isooctyl acrylate, 2-ethylhexyl acrylate, 2-ethylhexyl methacrylate, and isobornyl acrylate, and M3 is one or more monomers selected from the group consisting of isobornyl methacrylate and isodecyl methacrylate.

The polymerizable compositions are useful in kits that comprise the polymerizable composition and an initiator component for polymerizing the polymerizable composition, wherein the initiator component comprises an aerobic initiator. The aerobic initiator (e.g., an organoborane initiator) may be uncomplexed or complexed. Such kits are useful for bonding low surface energy substrates. For ease of application, the kits can further comprise a multi-part dispenser.

Once the parts of the kit are mixed together, bonding compositions are obtained. The compositions can be at least partially coated onto a substrate, particularly low surface energy substrates.

Once polymerized, a polymerized composition is obtained. The polymerized composition can be, for example, at least partially coated on a substrate or can be used to adhere a first and second substrate together. For example, methods of bonding at least one low surface energy substrate comprise the steps of:

providing a kit as described above, providing a low surface energy substrate, mixing the polymerizable composition with the initiator component to form a bonding composition;

coating at least a portion of the low surface energy substrate with the bonding composition; and adhering the coated low surface energy substrate to a second substrate.

Advantageously, in such methods, the initiator component can be mixed in an amount that provides as little as about 0.01 weight % boron based on total weight of the bonding composition.

DETAILED DESCRIPTION OF THE PREFERRED EMBODIMENTS

In general, this invention pertains to polymerizable compositions comprising monomer blends comprising at least two ethylenically unsaturated monomers. Preferably, polymerization of the at least two ethylenically unsaturated monomers is initiated aerobically.

"Aerobic initiators" operate in the presence of air or oxygen. Accordingly, preferred initiator systems incorporate organoborane polymerization initiator systems.

Advantageously, the present invention provides polymerizable compositions that have relatively low odor. "Low odor" compositions are those that have at least less odor than methyl methacrylate. Odor can be quantitatively measured using known methods, such as, for example, ASTM D4339-95, "Standard Test Method for Determination of the Odor of Adhesives." By using monomer blends having average boiling points of about 160° C. or more, the presently claimed compositions are less odorous than monomer blends exemplified for use previously when bonding low surface energy substrates.

Furthermore, the present invention provides polymerizable compositions that are useful for bonding low surface energy substrates. "Low surface energy substrates" are those that have a surface energy of less than 45 mJ/m$^2$, more typically less than 40 mJ/m$^2$ or less than 35 mJ/m$^2$. Included among such materials are polyethylene, polypropylene, acrylonitrile-butadiene-styrene, polyamide, and fluorinated polymers such polytetrafluoroethylene (commercially available from E. I. DuPont de Nemours; Wilmington, Del., under the trade designation, TEFLON), which has a surface energy of less than 20 mJ/m². Other polymers of somewhat higher surface energy that may be usefully bonded with the compositions of the invention include polycarbonate and polymethylmethacrylate. However, the invention is not so limited; the compositions may be used to bond any thermoplastic, as well as wood, ceramics, concrete, primed metals, and the like.

In one aspect of the invention, the polymerizable composition is part of a multi-part kit. Such kits comprise at least a first part (i.e., the polymerizable composition) and a second part (i.e., an initiator component) for initiating polymerization of the polymerizable composition. Most preferably, for ease of use, the kits comprise only two parts. The two parts of the kit may be readily combined in a convenient, commercially useful, whole number mix ratio of 1:10 or less, more preferably 1:4, 1:3, 1:2 or 1:1, such that they can be easily used with multi-part dispensers. Such dispensers are shown in U.S. Pat. Nos. 4,538,920 and 5,082,147 and are available from ConProTec, Inc. (Salem, N.H.) under the trade designation, MIXPAC. The parts of the kit can be readily mixed to form bonding compositions, which readily polymerize to polymerized compositions (i.e., polymers, for example, adhesives).

The "polymerizable composition" comprises at least two polymerizable monomers and, if a complexed initiator is used, at least one decomplexer. As described previously, polymerizable compositions of the present invention have relatively low odor as compared to conventional compositions, making for a more user-friendly adhesive.

The "initiator component" typically comprises at least one initiator, complexed (e.g., an organoborane amine complex) or uncomplexed (e.g., an organoborane), and an optional diluent. When mixed with the polymerizable composition, polymerization of the monomers in the polymerizable composition is enabled.

"Bonding compositions" are those compositions resulting from mixing of the polymerizable composition and the initiator component. The bonding compositions are useful for bonding a wide variety of substrates, including polymers, wood, ceramics, concrete, and metals. The bonding compositions are especially useful for bonding low-surface energy substrates.

"Polymerized compositions" (also referred to as polymers) are those bonding compositions where substantially all of the monomers in the polymerizable composition are polymerized, except for a typically unpolymerized amount as recognizable to one of ordinary skill in the art. Polymerized compositions according to the invention may be used in a wide variety of ways, including as adhesives, bonding materials, sealants, coatings, and injection molding resins. They may also be used as matrix resins in conjunction with glass, carbon, and metal fiber mats, such as those used in resin transfer molding operations. They may further be used as encapsulants and potting compounds, such as in the manufacture of electrical components, printed circuit boards, and the like.

Initiator Component

The initiator component initiates free-radical polymerization of the ethylenically unsaturated monomers to form a polymer that can be useful as, for example, an adhesive. To date, organoborane initiator components are preferred, but any suitable aerobic initiator component, or combinations thereof, may be utilized. Due to its availability and widespread use, however, the initiator will be more fully described below with reference to bonding compositions having organoborane initiators.

Adhesion to low surface energy substrates is promoted by using an effective amount of the organoborane initiator. The organoborane initiator may be complexed or uncomplexed. Surprisingly, a lower weight % of boron, based on the total weight of the bonding composition, can be used in combination with the claimed compositions as compared to those typically used for bonding low surface energy substrates. Typically, an effective amount of the organoborane initiator is an amount that provides as little as about 0.01 weight % boron to about 1.5 weight % boron, more preferably about 0.01 weight % boron to about 0.60 weight % boron, most preferably about 0.02 weight % boron to about 0.50 weight % boron, based on the total weight of the bonding composition, less the weight of fillers, non-reactive diluents, and other non-reactive components.

Uncomplexed Initiator

A variety of uncomplexed organoborane initiators may be used in the invention and the following structure (I) is representative of those that are suitable:

(I)

wherein:

B is boron;

$R^1$ is an alkyl group having 1 to about 10 carbon atoms, preferably having 1 to about 5 carbon atoms (e.g., ethyl or butyl);

$R^2$ and $R^3$ are independently selected from alkyl groups having 1 to about 10 carbon atoms, preferably having 1 to about 5 carbon atoms (e.g., ethyl or butyl), and phenyl-containing groups.

Complexed Initiator

To stabilize the organoborane initiator against premature oxidation, the organoborane initiator may be complexed with a complexer (e.g., with an amine component). In such instances, the organoborane initiator may be liberated from the complex by reacting the complexer with a material that is reactive therewith (i.e., a decomplexer).

A "complex" is readily understood by one of ordinary skill in the art to be a tightly coordinated salt formed by association of a Lewis acid (e.g., organoborane) and a Lewis base (e.g., amine). Such complexes may be represented by the following general structure (II):

(II)

wherein $R^4$ is an alkyl group having 1 to about 10 carbon atoms; $R^5$ and $R^6$ are independently selected from alkyl groups having 1 to about 10 carbon atoms and phenyl-containing groups; and Am represents an amine. Preferably, $R^4$, $R^5$ and $R^6$ are independently selected from alkyl groups having 1 to about 5 carbon atoms. Most preferably, $R^4$, $R^5$ and $R^6$ are the same.

The value of v is selected so as to provide an effective ratio of primary or secondary amine nitrogen atoms to boron atoms in the complex. The ratio of primary or secondary amine nitrogen atoms to boron atoms in the complex should broadly be about 0.5:1 to 4:1, preferably about 1:1.

The amine, Am, may comprise a variety of structures, for example, any primary or secondary amine, polyamine containing a primary or secondary amine, or ammonia. When solvent resistance in the ultimate polymerized acrylic composition is desired, however, Am preferably comprises a polyamine.

Specific initiators include trimethylborane, triethylborane, tri-n-propylborane, triisopropylborane, tri-n-butylborane, triisobutylborane, and tri-sec-butylborane. Specific amines include ammonia, n-butylamine, ethylenediamine, 1,6-hexanediamine, diethylamine, diethylenetriamine, and α,ω-diaminopolypropyleneoxide.

Organoborane amine complexes may be readily prepared using known techniques. Typically, the amine is combined with the organoborane in an inert atmosphere with slow stirring. An exotherm is often observed and cooling of the mixture is therefore recommended. If the ingredients have a high vapor pressure, it is desirable to keep the reaction temperature below about 70° C. to 80° C. Once the materials have been well mixed, the complex is permitted to cool to room temperature (i.e., about 22° C. to about 25° C.). No special storage conditions are required although it is preferred that the complex be kept in a capped vessel in a cool, dark location. Advantageously, the complexes can be prepared in the absence of organic solvents that would later have to be removed, although they could be prepared in solvent if so desired. Solvents used in the preparation of the complexes should, preferably be ones that do not coordinate amines, for example, tetrahydofuran or hexane.

Diluent

The initiator component may also contain any suitable diluent, or combinations thereof, such as an aziridine-functional material. For example, such diluents are described in PCT Publication No. WO 98/17694. Quite advantageously, when used, the organoborane amine complex is carried by (e.g., dissolved in or diluted by) an aziridine-functional material or a blend of two or more different aziridine-functional materials in the initiator component. Generally, the aziridine-functional material should not be reactive toward the complex and functions as an extender for the complex. Also advantageously, the aziridine-functional material may generally increase the spontaneous combustion temperature of the initiator component.

An "aziridine-functional material" refers to an organic compound having at least one aziridine ring or group,

the carbon atom(s) of which may optionally be substituted by short chain alkyl groups (e.g., groups having 1 to about 10 carbon atoms, preferably methyl, ethyl or propyl), so as to form, for example, methyl, ethyl or propyl aziridine moieties.

Examples of useful, commercially available polyaziridines include those available under the following trade designations: CROSSLINKER CX-100 (from Zeneca Resins; Wilmington, Mass.), XAMA-2 (from EIT, Inc.; Lake Wylie, S.C.), XAMA-7 (from EIT, Inc.; Lake Wylie, S.C.), and MAPO (tris [1-(2-methyl) aziridinyl] phosphine oxide (from Aceto Chemical Corporation; Flushing, N.Y.).

The aziridine-functional material should be generally soluble in monomers included in the polymerizable composition, such that the parts of the kit can be readily mixed. By "soluble" is meant that no evidence of gross phase separation at room temperature (i.e., about 22° C. to about 25° C.) is visible to the unaided eye. Similarly, the organoborane amine complex should also be soluble in the aziridine-functional material, although slightly warming a mixture of the complex and the aziridine-functional material may be helpful in forming a solution of the two at room temperature (i.e., about 22° C. to about 25° C.). Accordingly, preferably, if used, the aziridine-functional material is a liquid at or near room temperature (i.e., within about 10° C. of room temperature) or forms a liquid solution with the organoborane amine complex at or near room temperature.

The aziridine-functional material is used in an effective amount. Generally, this is an amount of not more than about 50 weight %, preferably not more than about 25 weight %, more preferably not more than about 10 weight %, based on the total weight of the bonding composition. Quite advantageously, however, substantial amounts (e.g., more than about 75 weight %, up to about 100 weight %) of the complex may be dissolved in the aziridine-functional material, which facilitates the provision of multi-part kits that can be combined in a commercially useful mix ratio.

Polymerizable Composition

Advantageously, the polymerizable compositions can be made substantially free of non-reactive, volatile organic solvents (i.e., the compositions include such solvents in amounts less than about 15% by weight, preferably less than about 5% by weight, and most preferably 0% by weight of the polymerizable composition).

Decomplexer

If a complexed initiator is used, a decomplexer is present in the polymerizable composition. Any suitable decomplexer, or combinations thereof, can be used, such as lower molecular weight carboxylic acid decomplexers described by Skoultchi et al. (U.S. Pat. Nos. 5,310,835 and 5,106,928), aldehydes described by Skoultchi (U.S. Pat. No. 5,286,821), sulfonyl chlorides and acid chlorides of Fujisawa, Imai, and Mashuhara (*Reports of the Institute for Medical and Dental Engineering*, vol. 3, p. 64 (1969)), bireactive decomplexers comprising isocyanate groups described by Deviny (PCT Publication No. WO97/07171), anhydride decomplexers described by Deviny (PCT Publication No. WO97/17383), carboxylic acid decomplexers described by Deviny et al. (PCT Publication No. WO99/64475, filed the same date herewith, entitled "Initiator Systems and Adhesive Compositions Made Therewith"), and mixtures thereof. All of these publications are incorporated herein by reference.

The decomplexer is employed in an effective amount (i.e., an amount effective to promote polymerization by liberating organoborane from its amine complex, but without materially adversely affecting the properties of the ultimate polymerized composition). As recognizable to one of ordinary skill in the art, larger amounts of decomplexer may permit polymerization to proceed too quickly and, in the case of adhesives, the resulting materials may demonstrate inadequate adhesion to low energy surfaces. However, if not enough decomplexer is used, the rate of polymerization may be too slow and the resulting polymers may not be of adequate molecular weight for certain applications. However, a reduced amount of decomplexer may be helpful in slowing the rate of polymerization if it is otherwise too fast. Thus, within these parameters, the decomplexer is typically provided in an amount such that the ratio of amine-reactive groups in the decomplexer(s) (e.g., acid groups or anhydride groups) to amine groups is in the range of 0.5:1.0 to 3.0:1.0. It should be noted that the number of amine groups includes both primary and secondary amine groups when the amine is a polyamine. For better performance, preferably the ratio of amine-reactive groups in the decomplexer(s) to amine groups is in the range of 0.5:1.0 to 1.0:1.0.

Monomers

Broadly, the polymerizable composition comprises a monomer blend that includes at least two ethylenically unsaturated monomers capable of free radical polymerization. Numerous compounds containing ethylenic unsaturation can be used in the polymerizable composition. Preferably, the composition includes at least one (meth) acrylic monomer, most preferably a methacrylic monomer. Particularly preferred are (meth)acrylic acid derivatives, such as those including esters and/or acid amides. Suitable are, for example, the (meth)acrylic esters of monohydric alcohols, particularly alkanols having from 1 to 12 carbon atoms, such as methyl (meth)acrylate, ethyl (meth)acrylate, butyl (meth)acrylate, ethylhexyl (meth)acrylate, and blends thereof. Preferably monomers are selected from the group of monomers illustrated in Table II, infra.

In addition, vinyl acetate; vinyl halides, such as vinyl chloride, vinyl fluoride, vinyl bromide; styrene; divinylbenzene; crotonic acid esters and maleic acid esters or the so-called, if desired, styrenized, unsaturated polyester resins, and blends thereof, can also be utilized as long as the blends satisfy the claimed criteria.

In general, the emphasis is on monomers with one or two olefinic double bonds in the molecule. The additional use of higher unsaturated components is not excluded, but it must be kept in mind that their presence can lead to embrittling of the polymerized compositions.

When more than one ethylenically unsaturated monomer is utilized, tailorability (e.g., formulation latitude) of the compositions is promoted. In this manner, a wider number of ethylenically unsaturated monomers can potentially be used, while still providing low odor polymerizable compositions that are useful for bonding low surface energy substrates. That is, changes in the bonding performance of the resulting adhesives and odor of the polymerizable composition can be effectuated, for example, by varying the ratio of individual monomers in the polymerizable composition. Yet another advantage of utilizing blends is cost-effectiveness. For example, less expensive monomers can be utilized in the blends as "extenders" for more expensive, usually lower odor, monomers. In this manner, a balance between cost and odor can be achieved.

More specifically, the ethylenically unsaturated monomer blends of the present invention have (1) a certain average fluorocarbon miscibility, hereinafter referred to as fluorophilicity; (2) a certain glass transition temperature (Tg) for the polymer formed by polymerization of the monomer blend; and (3) a certain average boiling point. Criteria (1) and (2) enable adequate bonding to low surface energy substrates. While not wishing to be bound by any particular theory, it is believed that highly fluorophilic monomer blends more ably penetrate solid, low surface energy substrates, affording polymer chain entanglement and/or grafting in the interphase regions (i.e., those regions comprising elements from both the adhesive and the substrate) during polymerization, thereby making possible the structural bonding of the low surface energy substrates. Criteria (3) enables preparation of low odor polymerizable compositions. Average Fluorophilicity, average glass transition temperature, and average boiling point can be calculated using an individual monomer's fluorophilicity, glass transition temperature, and boiling point. These individual monomer properties can be measured using any known technique or found they can be found in Brandrup, J. et al., ed., *Polymer Handbook*, 2$^{nd}$ Ed. (1975).

Criteria (1): Monomer blends are suitable for use in the claimed invention, so long as the claimed average monomer fluorophilicity criterion is satisfied. Individual monomer fluorophilicity is measured by a monomer's miscibility in fluorocarbon blends comprising various ratios of perfluorinated octanes (such as those commercially available under the trade designation FLUORINERT FC-75, from Minnesota Mining and Manufacturing Company; St. Paul, Minn.) and 1H,1H-perfluorooctyl methacrylate (FOMA, commercially available from Polyscience, Inc.; Warrington, Pa.). Monomer fluorophilicity can be determined, for example, using a blend of 0.5 milliliter monomer and 1 milliliter fluorocarbon. The blend is prepared and allowed to sit at room temperature (i.e., about 22° C. to about 25° C.) for about two hours. "Miscibility" is determined by whether gross phase separation visible to the unaided eye occurs at room temperature (i.e., about 22° C. to about 25° C.). Representative monomer fluorophilicity assignments have been determined for a number of monomers, as illustrated in Table II, infra.

Average monomer fluorophilicity may be calculated for a monomer blend by the following equation:

$$\Phi_{blend} = \Sigma(X_n \cdot \Phi_n)$$

wherein $\Phi_{blend}$ is the average monomer fluorophilicity, $X_n$ is the weight fraction of a given individual monomer based on total weight of the monomer component, and $\Phi_n$ is the fluorophilicity of that individual monomer (see Tables I and II, infra). Useful monomer blends of the invention have an average monomer fluorophilicity of 3.25 or greater. More preferably, monomer blends of the present invention have an average monomer fluorophilicity of at least about 3.50.

Criteria (2): Monomer blends are suitable for use in the claimed invention, so long as the claimed $Tg_{blend}$ criterion is satisfied. The glass transition temperature of a polymer formed by polymerization of a monomer blend may be calculated using the following equation:

$$Tg_{blend} = (\Sigma(X_n/(273+Tg_n)))^{-1} - 273$$

wherein $Tg_{blend}$ is the glass transition temperature (in degrees Celsius) of the polymer formed by polymerization of the monomer blend, $X_n$ is the weight fraction of a given individual monomer, and $Tg_n$ is the glass transition temperature (in degrees Celsius) of the homopolymer formed by polymerization of that individual monomer.

Monomer blends of the invention have average glass transition temperatures between about −20° C. and about 80° C., preferably between about −10° C. and about 80° C., more preferably between about 0° C. and about 80° C., and most preferably between about 20° C. and about 80° C.

Criteria (3): Monomer blends are suitable for use in the claimed invention, so long as the claimed boiling point criterion is satisfied. While monomer boiling point is not critical to the utility of the invention with respect to adhesion to low energy surfaces, polymerizable compositions comprising higher boiling point monomers generally produce less offensive odors and are preferred. Preferred monomer blends have average boiling points greater than about 160° C., more preferably greater than 190° C., and most preferably greater than 210° C.

$$BP_{blend} = \Sigma(X_n \cdot BP_n)$$

wherein $BP_{blend}$ is the boiling point (in degrees Celsius) of the monomer blend, $X_n$ is the weight fraction of a given individual monomer, and $BP_n$ is the boiling point (in degrees Celsius) of the individual monomer.

Based upon the above noted selection criteria, commercial availability, toxicity, and cost, examples of useful monomer blends include the following combinations: In one combination, the monomers can be generally selected from:

10–90 wt % M1, 25–70 wt % M2, and 0–65 wt % M3 based on total weight of the monomer blend, wherein:

M1 is tetrahydrofurfuryl methacrylate;

M2 is one or more monomers selected from the group consisting of 2-ethoxyethyl methacrylate, n-hexyl acrylate, cyclohexyl methacrylate, isooctyl acrylate, 2-ethylhexyl acrylate, 2-ethylhexyl methacrylate, and isobornyl acrylate; and M3 is one or more monomers selected from the group consisting of isobutyl methacrylate, n-butyl methacrylate, cyclohexyl acrylate, n-hexyl methacrylate, isobornyl methacrylate, and isodecyl methacrylate.

Due to the relatively higher irritation-potential of acrylate monomers, preferably at least one of M2 and M3 is a methacrylate monomer. Most preferably, both of M2 and M3 are methacrylate monomers.

Even more preferred monomer combinations comprise monomer blends whose average boiling points are greater than 190° C. For example, such blends may comprise 10–90 wt % M1, 25–70 wt % M2, and 0–65 wt % M3 based on total weight of the monomer blend, wherein:

M1 is tetrahydrofurfuryl methacrylate;

M2 is one or more monomers selected from the group consisting of 2-ethoxyethyl methacrylate, cyclohexyl methacrylate, isooctyl acrylate, 2-ethylhexyl acrylate, 2-ethylhexyl methacrylate, and isobornyl acrylate; and M3 is one or more monomers selected from the group consisting of n-hexyl methacrylate, isobornyl methacrylate, and isodecyl methacrylate.

Even more preferred monomer combinations comprise monomer blends whose average boiling points are greater than 210° C. Most preferred monomer blends comprise 10–90 wt % M1, 25–70 wt % M2, and 0–65 wt % M3, based on total weight of the monomer blend, wherein:

M1 is tetrahydrofurfuryl methacrylate;

M2 is one or more monomers selected from the group consisting of 2-ethoxyethyl methacrylate, isooctyl acrylate, 2-ethylhexyl acrylate, 2-ethylhexyl methacrylate, and isobornyl acrylate; and M3 is one or more monomers selected from the group consisting of isobornyl methacrylate, and isodecyl methacrylate.

Additives

Bonding compositions of the present invention may also comprise further optional additives. Generally, such additives are present in the polymerizable composition of the kit. Thus, the polymerizable composition may further comprise a variety of optional additives.

One particularly useful additive is a thickener, such as medium (about 40,000) molecular weight polybutyl methacrylate that may generally be incorporated in an amount of up to about 50 weight %, based on the total weight of the polymerizable composition. Thickeners may be employed to increase the viscosity of the resulting bonding composition to a more easily applied viscous syrup-like consistency.

Another particularly useful additive is an elastomeric material. These materials can improve the fracture toughness of bonding compositions made therewith, which can be beneficial when, for example, bonding stiff, high yield strength materials (e.g., metal substrates that do not mechanically absorb energy as easily as other materials, such as flexible polymeric substrates). Such additives can generally be incorporated in an amount of up to about 50% by weight, based on the total weight of the polymerizable composition.

Core-shell polymers can also be added to the polymerizable composition to impart enhanced spreading and flow properties to the bonding composition. These enhanced properties may be manifested by a reduced tendency for the bonding composition to leave an undesirable "string" upon dispensing from a syringe-type applicator, or sag or slump after having been applied to a vertical surface. Accordingly, use of more than about 20% by weight, based on total weight of the polymerizable composition, of a core-shell polymer additive may be desirable for achieving improved sag-slump resistance.

Small amounts of inhibitors, such as hydroquinone monomethyl ether may be used in the polymerizable compositions, for example, to prevent or reduce degradation of the monomers during storage. Inhibitors may be added in an amount that does not materially reduce the rate of polymerization or the ultimate properties of polymers made therewith. Accordingly, inhibitors are generally useful in amounts of about 100–10,000 ppm based on the total weight of the monomers in the polymerizable composition.

Other possible additives include non-reactive colorants, fillers (e.g., carbon black, hollow glass/ceramic beads, silica, titanium dioxide, solid glass/ceramic spheres, and chalk), and the like. The various optional additives are employed in any amount, but generally amounts that do not significantly adversely affect the polymerization process or the desired properties of polymers made therewith.

Bonding Compositions

The parts of the kits (i.e., the polymerizable composition and the initiator component) are blended as would normally be done when working with such materials. The initiator component is added to the polymerizable composition shortly before it is desired to use the bonding composition.

Once the parts of the kit have been combined to form a bonding composition, the composition should be used quickly, as the useful pot life may be short depending upon the monomers, the amount of the initiator component, the temperature at which the bonding is to be performed, the presence or absence of crosslinking agents, and whether a diluent is used. Preferably, to improve the degree of polymerization it is desirable to keep the temperature below about 40° C., preferably below 30° C., and most preferably below about 25° C. Accordingly, the bonding process can be carried out at room temperature (i.e., about 22° C. to about 25° C.).

The bonding composition is applied to one or both substrates to be bonded and then the substrates are joined together with pressure to force excess bonding composition out of the bond line. The use of pressure has the advantage of displacing bonding composition that has been exposed to air and that may have begun to oxidize. In general, the bonds should be made shortly after the bonding composition has been applied to the substrate(s), preferably within about 10 minutes. The typical bond line thickness is about 0.1 to 0.3 millimeters.

The bonds may cure (i.e., polymerize) to a reasonable green strength, i.e., to permit handling of such bonded articles within about 2–3 hours. Full bond strength will generally be reached in about 24 hours under ambient conditions. However, post-curing with heat may be used, if desired.

In one preferred embodiment, the bonding compositions are coated on a low surface energy substrate. In another preferred embodiment, bonded articles comprise a first substrate and a second substrate (preferably at least one of which is a low surface energy polymeric material) adhesively bonded together by a layer of a bonding composition according to the invention.

The invention will be more fully appreciated with reference to the following nonlimiting examples. These examples are merely for illustrative purposes only and are not meant to be limiting on the scope of the appended claims. All parts, percentages, ratios, etc. in the examples and the rest of the specification are by weight unless indicated otherwise.

EXAMPLES

Overlap Shear Bond Strength Test Method

Each bonding composition was applied directly onto an untreated 2.5 cm×10 cm×0.3 cm (1 inch×4 inch×0.125 inch) test panel (0.2 millimeter (8 mil)-diameter glass bead spacers were added to the bonding composition) and a bare second test panel was immediately placed against the bonding composition on the first test panel so that the overlapped area was 1.3 cm×2.5 cm (0.5 inch×1 inch). A clamp was applied to the overlapped area. The test panels were either polytetrafluoroethylene (PTFE), high-density polyethylene (HDPE) or polypropylene (PP), both commercially available from Cadillac Plastic; Minneapolis, Minn. A small amount of bonding composition squeezed out of the overlapped area and was allowed to remain.

The bonds were allowed to cure for at least 48 hours at 22° C. The clamps were then removed, and the overlap bonds were tested in shear (OLS) on a tensile tester at a crosshead speed of 1.27 cm/minute (0.5 inch/minute). The overlap shear values were recorded in pounds and converted into pounds per square inch (psi) and megapascals (MPa).

Preferably, for adequate bonding performance, the OLS values were at least about 150 psi (1.03 MPa), more preferably at least about 300 psi (4.14 MPa) for the PTFE; at least about 500 psi (3.45 MPa), more preferably at least about 700 psi (4.83 MPa) for the HDPE; and at least about 600 psi (4.14 MPa), more preferably at least about 800 psi (5.52 MPa) for the PP. Also, for diverse utility, it is preferable that a particular adhesive is able to adequately bond at least two different types of low surface energy substrates. Accordingly, more preferably, a particular adhesive is able to adequately bond all of PTFE, HDPE, and PP. Most preferably, a particular adhesive is able to adequately bond PTFE to an OLS value of at least about 300 psi (4.14 MPa), HDPE to an OLS value of at least about 700 psi (4.83 MPa), and PP to an OLS value of at least about 800 psi (5.52 MPa).

Monomer Fluorophilicity

Individual monomer fluorophilicity was measured by monomer miscibility in fluorocarbon blends comprising various ratios of perfluorinated octanes (such as those commercially available under the trade designation FLUORINERT FC-75 from Minnesota Mining and Manufacturing Co.; St. Paul, Minn.) and 1H,1H-perfluorooctyl methacrylate (FOMA, commercially available from Polyscience, Inc.; Warrington, Pa.). Monomer fluorophilicity was determined using a blend of 0.5 milliliter monomer and 1 milliliter fluorocarbon. The blend was prepared and then allowed to sit at room temperature (i.e., about 22° C. to about 25° C.) for about two hours.

Miscibility was then determined for each blend. Miscibility" is determined by whether gross phase separation visible to the unaided eye occurs at room temperature (i.e., about 22° C. to about 25° C.). A monomer miscible with FLUORINERT FC-75 itself was assigned a fluorophilicity of 9. A monomer immiscible with FOMA was assigned a fluorophilicity of 0, and a monomer with an intermediate fluorocarbon miscibility was assigned an intermediate fluorophilicity, as tabulated in Table I.

TABLE I

| Monomer Fluorophilicity | Maximum FLUORINERT FC-75:FOMA volume ratio at which monomer is miscible |
|---|---|
| 9 | 100:0 |
| 8 | 87.5:12.5 |
| 7 | 75:25 |
| 6 | 62.5:37.5 |
| 5 | 50:50 |
| 4 | 37.5:62.5 |
| 3 | 25:75 |
| 2 | 12.5:87.5 |
| 1 | 0:100 |
| 0 | immiscible at all ratios |

Representative fluorophilicity assignments for individual monomers are tabulated below in Table II along with approximate glass transition temperature of the homopolymer thereof and boiling point data.

TABLE II

| Monomer | Fluorophilicity | Tg (° C.) | BP (° C.) |
|---|---|---|---|
| methyl methacrylate | 5 | 105 | 100 |
| t-butyl acrylate | 6 | 41 | 120 |
| t-butyl methacrylate | 6 | 107 | 140 |
| n-butyl acrylate | 5 | −54 | 145 |
| isobutyl methacrylate | 6 | 73 | 155 |
| methacrylic acid | 5 | 185 | 161 |
| n-butyl methacrylate | 5 | 20 | 164 |
| cyclohexyl acrylate | 3 | 15 | 184 |
| 2-methoxyethyl methacrylate | 4 | 16 | 190 |
| n-hexyl acrylate | 4 | −45 | 190 |
| 1H,1H-perfluorooctyl methacrylate | 9 | 60 | 200 |
| cyclohexyl methacrylate | 4 | 66 | 210 |
| n-hexyl methacrylate | 3 | −5 | 210 |
| isooctyl acrylate | 4 | −99 | 215 |
| 2-ethylhexyl acrylate | 4 | −50 | 217 |
| 2-hydroxyethyl methacrylate | 0 | 55 | 220 |
| tetrahydrofurfuryl acrylate | 1 | −12 | 220 |
| tetrahydrofurfuryl methacrylate | 3 | 60 | 225 |
| benzyl acrylate | 1 | 6 | 228 |
| 2-ethylhexyl methacrylate | 4 | −10 | 229 |
| benzyl methacrylate | 1 | 54 | 230 |
| 2-cyanoethyl acrylate | 0 | 4 | 235 |
| isobornyl acrylate | 4 | 94 | 245 |
| 2-(2-ethoxyethoxy)ethyl acrylate | 1 | −70 | 250 |
| isobornyl methacrylate | 3 | 110 | 255 |
| 2-phenoxyethyl methacrylate | 0 | 54 | 270 |
| isodecyl methacrylate | 3 | −30 | 275 |
| lauryl acrylate | 1 | −3 | 310 |
| lauryl methacrylate | 1 | −55 | 320 |
| 2-phenoxyethyl acrylate | 0 | −22 | 325 |

As can be recognized from Table II, many of the individual monomers provide inadequate compositions and adhesives by themselves. Blends of the present invention, however, allow many otherwise unusable monomers to be used in the claimed polymerizable compositions. As long as the monomer blends satisfy the claimed criteria, any combination of monomers can be used. It is preferable, however, that at least one of the monomers in the blends is a methacrylate monomer. More preferably, at least two of the monomers in the blends are methacrylate monomers. Most preferably, all of the monomers in the blends are methacrylate monomers.

Example 1

Initiator Component

A triethylborane-hexamethylenediamine complex (1.52 grams) at a respective molar ratio of 2:1, was dissolved in trimethylolpropane tris(3-(2-methylaziridino))propionate (3.48 grams, commercially available under the trade designation CROSSLINKER CX-100 from Zeneca Resins; Wilmington, Mass.).

Polymerizable Composition

A slurry containing a core-shell toughener (10.00 grams, commercially available under the trade designation BLENDEX 360 from GE Specialty Chemicals; Parkersburg, W. Va.) and tetrahydrofurfuryl methacrylate (24.95 grams, commercially available from Aldrich Chemical Co.; Milwaukee, Wis.) was allowed to stand at 65° C. for 17 hours. The resultant, opaque dispersion was allowed to cool and sheared aggressively with a saw-toothed blade of a laboratory dispersator, commercially available from Premier Mill Corporation; Reading, Pa. Then, 2-ethylhexyl methacrylate (8.32 grams, commercially available from Aldrich Chemical Co.; Milwaukee, Wis.) and 2-acryloyloxyethyl maleate (6.73 grams, commercially available from RohmTech (now Hüls); Somerset, N.J. were added to the dispersion and mixed well. The monomer blend had a calculated fluorophilicity of 3.25, a calculated boiling point of 226° C., and the calculated glass transition temperature of a resulting polymer was 39° C.

Adhesive

The polymerizable composition and initiator component were packaged in a MIXPAC SYSTEM 50 10:1 volume ratio dual syringe applicator (Kit No. MP-050-10-09, commercially available from ConProTec, Salem, N.H.), the larger cylinder holding the polymerizable composition and the smaller cylinder holding the initiator component. The two parts were combined by simultaneous extrusion through a 4 inch long (10 cm), 17-stage static mix nozzle (Part No. MX 4-0-17-5, commercially available from ConProTec, Salem, N.H.). The bonding composition was tested according to the Overlap Shear Bond Strength Test Method described above. The results are illustrated in Table III.

TABLE III

| Substrate | Overlap Shear, psi (MPa) |
|---|---|
| PTFE | 353 (2.43) |
| HDPE | 920 (6.34) |
| PP | 1,137 (7.84) |

Examples 2–7

Adhesives were prepared and evaluated as in Example 1, but using various monomer blends in place of the tetrahydrofurfuryl methacrylate/2-ethylhexyl methacrylate blend. The results are illustrated in Table IV.

TABLE IV

| | | Ex. 2 | Ex. 3 | Ex. 4 | Ex. 5 | Ex. 6 | Ex. 7 |
|---|---|---|---|---|---|---|---|
| Weight of Monomer (grams) | 2-ethylhexyl methacrylate | — | — | — | — | 11.64 | 11.64 |
| | isooctyl acrylate | — | 8.32 | — | — | — | — |
| | isobornyl acrylate | 8.32 | — | — | — | — | — |
| | isobutyl methacrylate | — | — | 16.64 | 10.65 | 13.31 | 8.32 |
| | tetrahydrofurfuryl methacrylate | 24.95 | 24.95 | 16.64 | 22.62 | 8.31 | 14.97 |
| | $\Phi_{blend}$ | 3.25 | 3.25 | 4.50 | 3.96 | 4.55 | 4.05 |
| | $Tg_{blend}$(° C.) | 68 | -2 | 66 | 64 | 36 | 35 |
| | $BP_{blend}$(° C.) | 230 | 222 | 190 | 203 | 198 | 220 |
| | Overlap Shear PTFE, psi | 172 | 216 | 402 | 399 | 420 | 381 |
| | (MPa) | (1.19) | (1.49) | (2.77) | (2.75) | (2.90) | (2.63) |
| | Overlap Shear HDPE, psi | 789 | 800 | 957 | 752 | 855 | 953 |
| | (MPa) | (5.44) | (5.52) | (6.60) | (5.18) | (5.90) | (6.57) |
| | Overlap Shear PP, psi | 871 | 879 | 1,159 | 1,159 | 949 | 1,089 |
| | (MPa) | (6.01) | (6.06) | (7.99) | (7.99) | (6.54) | (7.51) |

Example 8

Initiator Component

A triethylborane-hexamethylenediamine complex (6.24 grams) at a respective molar ratio of 2:1, was dissolved in trimethylolpropane tris (3-(2-methylaziridino)) propionate (11.08 grams, commercially available under the trade designation CROSSLINKER CX-100 from Zeneca Resins; Wilmington, Mass.).

Polymerizable Composition

A monomer blend containing a core-shell toughener (7.76 grams, commercially available under the trade designation BLENDEX 360 from GE Specialty Chemicals; Parkersburg, W. Va.), isobornyl acrylate (22.5 grains, commercially available from Aldrich Chemical Co.; Milwaukee, Wis.), 2-(2-ethoxyethoxy)ethyl acrylate (7.5 grams, commercially available from Morton International, Inc.; Chicago Ill.), and methacrylic anhydride (2.24 grams, commercially available from Aldrich Chemical Co.; Milwaukee, Wis.) was prepared as in Example 1. The monomer blend had a calculated fluorophilicity of 3.25, a calculated boiling point of 246° C., and the calculated glass transition temperature of a resulting polymer was 32° C.

Adhesive

The adhesive was prepared and evaluated as in Example 1. The results are illustrated in Table V

TABLE V

| Substrate | Overlap Shear, psi (MPa) |
|---|---|
| PTFE | 164 (1.13) |
| HDPE | 845 (5.83) |
| PP | 821 (5.66) |

Examples 9–12

Adhesives were prepared and evaluated as in Example 1, but using lower proportions of the triethylborane-hexamethylenediamine complex (TEB-HMDA) in the initiator component, as noted in Table VI. In each Example, the monomer blend had a calculated fluorophilicity of 3.25, a calculated boiling point of 226° C., and the calculated glass transition temperature of a resulting polymer was 39° C.

TABLE VI

|  |  | Ex. 9 | Ex. 10 | Ex. 11 | Ex. 12 |
|---|---|---|---|---|---|
| Weight of Component (grams) | TEB-HMDA | 1.00 | 0.52 | 0.25 | 0.12 |
|  | CX-100 | 4.00 | 4.48 | 4.75 | 4.88 |
| Overlap Shear PTFE, psi (MPa) | | 359 (2.48) | 362 (2.50) | 353 (2.43) | 139 (0.96) |
| Overlap Shear HDPE, psi (MPa) | | 958 (6.61) | 955 (6.58) | 950 (6.55) | 942 (6.49) |
| Overlap Shear PP, psi (MPa) | | 1,117 (7.70) | 1,109 (7.65) | 1,088 (7.50) | 980 (6.76) |

Example 13

Initiator Component

Triethylborane (1.00 grams, commercially available from Akzo Chemical Inc.; Chicago, Ill.) was dissolved in trimethylolpropane tris (3-(2-methylaziridino)) propionate (4.00 grams, commercially available under the trade designation CROSSLINKER CX-100 from Zeneca Resins; Wilmington, Mass.) under a nitrogen atmosphere.

Polymerizable Composition

Z-light W-1600 ceramic spheres (2.50 grams, 150–350 micron, Zeelan Industries, Inc.; St. Paul, Minn.) were dispersed in a homogeneous slurry containing a core-shell toughener (10.00 grams, commercially available under the trade designation BLENDEX 360 from GE Specialty Chemicals; Parkersburg, W. Va.), tetrahydrofurfuryl methacrylate (26.08 grams, commercially available from Aldrich Chemical Co.; Milwaukee, Wis.), 2-ethylhexyl methacrylate (8.70 grams, commercially available from Aldrich Chemical Co.; Milwaukee, Wis.), and 2-acryloyloxyethyl maleate (5.22 grams, commercially available from Rohm Tech (now Hüls); Somerset, N.J.)

Adhesive

Adhesives were prepared and evaluated as in Example 1, except that the glass bead spacers were omitted.

TABLE VII

| Substrate | Overlap Shear, psi (MPa) |
|---|---|
| PTFE | 330 (2.28) |
| HDPE | 743 (5.12) |
| PP | 814 (5.61) |

Comparative Examples C1–C7

Adhesives comprising 2-acryloyloxyethyl maleate were prepared and evaluated as in Example 1, but using various monomer blends with calculated fluorophilicities and/or glass transition temperatures that do not satisfy the claimed criteria. Reduced overlap shear bond strength is evident in these Examples, as compared to those of the invention.

TABLE VIII

|  |  | Ex. C1 | Ex. C2 | Ex. C3 | Ex. C4 | Ex. C5 | Ex. C6 | Ex. C7 |
|---|---|---|---|---|---|---|---|---|
| Weight of monomer (grams) | isobornyl acrylate | 24.95 | — | — | — | — | — | — |
|  | tetrahydrofurfuryl methacrylate | 8.32 | 8.32 | — | — | — | 11.88 | 11.88 |
|  | isooclyl acrylate | — | 24.95 | — | — | — | — | — |
|  | methyl methacrylate | — | — | 8.32 | — | — | — | — |
|  | n-butyl acrylate | — | — | 24.95 | — | — | — | — |
|  | 2-phenoxyethyl methacrylate | — | — | — | 33.27 | 11.09 | — | — |
|  | 2-phenoxyethyl acrylate | — | — | — | — | 11.09 | — | — |
|  | tetrahydrofurfuryl acrylate | — | — | — | — | 11.09 | — | — |
|  | isobornyl methacrylate | — | — | — | — | — | 14.26 | 14.26 |
|  | 2-ethylhexyl methacrylate | — | — | — | — | — | 7.13 | — |
|  | 2-ethylhexyl acrylate | — | — | — | — | — | — | 7.13 |
| $\Phi_{blend}$ | | 3.75 | 3.75 | 5.00 | 0.00 | 0.33 | 3.21 | 3.21 |
| $Tg_{blend}$(° C.) | | 85 | −75 | −28 | 54 | 3 | 60 | 37 |
| $BP_{blend}$(° C.) | | 240 | 218 | 134 | 270 | 272 | 239 | 236 |
| Overlap Shear PTFE, psi (MPa) | | 56 (0.39) | 103 (0.71) | 21 (0.14) | 30 (0.21) | 134 (0.92) | 140 (0.97) | 278 (1.92) |
| Overlap Shear HDPE, psi (MPa) | | 405 (2.79) | 344 (2.37) | 309 (2.13) | 42 (0.29) | 663 (4.57) | 364 (2.51) | 531 (3.66) |
| Overlap Shear PP, psi (MPa) | | 400 (2.76) | 157 (1.08) | 337 (2.32) | 119 (0.82) | 718 (4.95) | 518 (3.57) | 665 (4.59) |

Comparative Examples C8–C12

Adhesives were prepared and evaluated as in Example 8. As in Comparative Examples C1–C7, the various monomer blends had calculated fluorophilicities and/or glass transition temperatures that did not satisfy the claimed criteria. Reduced overlap shear bond strength is evident in these Examples, as compared to those of the invention.

TABLE IX

| | | Ex. C8 | Ex. C9 | EX. C10 | Ex. C11 | Ex. C12 |
|---|---|---|---|---|---|---|
| Weight of Monomer (grams) | isobornyl acrylate | — | 22.5 | — | — | — |
| | isobornyl methacrylate | 7.5 | — | 22.5 | 22.5 | — |
| | 2-(2-ethoxy-ethoxy)-ethyl acrylate | 22.5 | — | 7.5 | — | — |
| | 2-cyanoethyl acrylate | — | 7.5 | — | 7.5 | — |
| | t-butyl methacrylate | — | — | — | — | 12 |
| | isobutyl methacrylate | — | — | — | — | 12 |
| | methyl methacrylate | — | — | — | — | 6 |
| $\Phi_{blend}$ | | 1.50 | 3.00 | 2.50 | 2.25 | 5.80 |
| $Tg_{blend}$(° C.) | | −43 | 66 | 41 | 77 | 92 |
| $BP_{blend}$(° C.) | | 251 | 243 | 254 | 250 | 148 |
| Overlap Shear PTFE, psi | | 75 | 58 | 88 | 53 | 274 |
| (MPa) | | (0.52) | (0.40) | (0.61) | (0.37) | (1.89) |
| Overlap Shear HDPE, psi | | 396 | 845 | 507 | 635 | 496 |
| (MPa) | | (2.73) | (5.83) | (3.50) | (4.38) | (3.42) |
| Overlap Shear PP, psi | | 305 | 122 | 181 | 200 | 613 |
| (MPa) | | (2.10) | (0.84) | (1.25) | (1.38) | (4.23) |

Various modifications and alterations of this invention will become apparent to those skilled in the art without departing from the scope and spirit of the invention. It should be understood that this invention is not limited to the illustrative embodiments set forth herein.

What is claimed is:

1. A kit useful for bonding low surface energy substrates, comprising:
   a first part comprising:
   a polymerizable composition comprising a monomer blend comprising:
   a first ethylenically unsaturated monomer;
   a second ethylenically unsaturated monomer, wherein the monomer blend has an average boiling point of at least about 160° C., and an average monomer fluorophilicity of at least 3.25, and wherein the monomer blend is polymerizable to a polymer having a glass transition temperature of at least about −20° C.; and
   a second part comprising:
   an initiator component for polymerizing the polymerizable composition, wherein the initiator component comprises an aerobic initiator.

2. The kit of claim 1, wherein the first ethylenically unsaturated monomer is alkyl methacrylate, alkyl acrylate, or a combination thereof.

3. The kit of claim 1, wherein the first and second ethylenically unsaturated monomers are alkyl methacrylates, alkyl acrylates, or a combination thereof.

4. The kit of claim 1, wherein the first ethylenically unsaturated monomer is an alkyl methacrylate.

5. The kit of claim 1, wherein the first and second ethylenically unsaturated monomers are alkyl methacrylates.

6. The kit of claim 1, wherein the monomer blend has an average boiling point of at leas about 190° C.

7. The kit of claim 1, wherein the monomer blend has an average boiling point of at least about 210° C.

8. The kit of claim 1, wherein the monomer blend has an average monomer fluorophilicity of at least about 3.50.

9. The kit of claim 1, wherein the monomer blend is polymerizable to a polymer having a glass transition temperature of about 20° C. to about 80° C.

10. The kit of claim 1, wherein the monomer blend comprises:
   10–90 wt % M1, 25–70 wt % M2, and 0–65 wt % M3 based on total weight of the monomer blend, wherein:
   M1 is tetrahydrofurfuryl methacrylate;
   M2 is one or more monomers selected from the group consisting of 2-ethoxyethyl methacrylate, n-hexyl acrylate, cyclohexyl methacrylate, isooctyl acrylate, 2-ethylhexyl acrylate, 2-ethylhexyl methacrylate, and isobornyl acrylate; and
   M3 is one or more monomers selected from the group consisting of isobutyl methacrylate, n-butyl methacrylate, cyclohexyl acrylate, n-hexyl methacrylate, isobornyl methacrylate, and isodecyl methacrylate.

11. The kit of claim 10, wherein:
   M2 is one or more monomers selected from the group consisting of 2-ethoxyethyl methacrylate, cyclohexyl methacrylate, isooctyl acrylate, 2-ethylhexyl acrylate, 2-ethylhexyl methacrylate, and isobornyl acrylate; and
   M3 is one or more monomers selected from the group consisting of n-hexyl methacrylate, isobornyl methacrylate, and isodecyl methacrylate.

12. The kit of claim 10, wherein:
   M2 is one or more monomers selected from the group consisting of 2-ethoxyethyl methacrylate, isooctyl acrylate, 2-ethylhexyl acrylate, 2-ethylhexyl methacrylate, and isobornyl acrylate; and
   M3 is one or more monomers selected from the group consisting of isobornyl methacrylate and isodecyl methacrylate.

13. The kit of claim 1 where the aerobic initiator is uncomplexed.

14. The kit of claim 1, wherein the aerobic initiator is complexed with a complexer comprising an amine component.

15. The kit of claim 1, wherein the aerobic initiator is an organoborane initiator.

16. The kit of claim 1, further comprising a multi-part dispenser that separates the first and second parts.

17. The kit of claim 1, wherein the initiator is mixed in an amount that provides as little as about 0.01 weight % boron based on total weight of the initiator component and polymerizable composition.

18. A bonding composition, comprising the polymerizable composition of the kit according to claim 1 mixed with the initiator component of the kit according to claim 1.

19. A polymerized composition, comprising the polymerization product of the kit of claim 18.

20. A substrate at least partially coated with the composition of claim 19.

21. A substrate at least partially coated with the composition of claim 18.

22. The substrate of claim 20, wherein the substrate is a low surface energy substrate.

23. The low surface energy substrate of claim 21, wherein the substrate is adhered to a second substrate with the polymerized composition of claim 19.

24. A method of bonding at least one low surface energy substrate, comprising the steps of:
- providing a kit according to claim 1,
- providing a low surface energy substrate,
- mixing the polymerizable composition with the initiator component to form a bonding composition;
- coating at least a portion of the low surface energy substrate with the bonding composition; and
- adhering the low surface energy substrate to a second substrate.

* * * * *